United States Patent
Cheng

(10) Patent No.: US 6,715,828 B1
(45) Date of Patent: Apr. 6, 2004

(54) INFANT CARRIER

(76) Inventor: Kenny Cheng, No. 16, Lane 47, Chih Feng St., Taipei (TW)

( * ) Notice: Subject to any disclaimer, the term of this patent is extended or adjusted under 35 U.S.C. 154(b) by 0 days.

(21) Appl. No.: 10/265,816

(22) Filed: Oct. 7, 2002

(51) Int. Cl.[7] .............................................. A47D 1/10
(52) U.S. Cl. ........................ 297/183.3; 297/183.2; 297/256.16; 297/250.1
(58) Field of Search ........................ 297/256.16, 250.1, 297/183.3, 183.2

(56) References Cited

U.S. PATENT DOCUMENTS

| | | | | |
|---|---|---|---|---|
| 4,634,175 A | * | 1/1987 | Wise | 297/183.3 |
| 4,634,177 A | * | 1/1987 | Meeker | 297/183.2 X |
| 5,385,387 A | * | 1/1995 | Kain | 297/256.16 |
| 5,522,639 A | * | 6/1996 | Jaime | 297/183.3 X |
| 5,567,008 A | * | 10/1996 | Cone, II | 297/256.16 |
| 5,581,234 A | * | 12/1996 | Emery et al. | 297/250.1 X |
| 5,676,386 A | * | 10/1997 | Huang | 297/256.16 X |
| 5,772,279 A | * | 6/1998 | Johnson, Jr. | 297/256.16 X |
| 6,145,927 A | * | 11/2000 | Lo | 297/183.3 X |
| 6,428,100 B1 | * | 8/2002 | Kain et al. | 297/256.16 |
| 6,572,134 B2 | * | 6/2003 | Barrett et al. | 297/256.16 X |

* cited by examiner

*Primary Examiner*—Peter R. Brown
*Assistant Examiner*—Rodney B. White
(74) *Attorney, Agent, or Firm*—Gauthier & Connors LLP

(57) ABSTRACT

An infant carrier is provide, which includes a frame having a rotating knob at each side, a handle having both ends connected to the respective rotating knobs of the frame, and a connection mechanism mounted at the bottom of the frame. The infant carrier is characterized by a gripping device provided on the handle. The gripping device includes wires and a wire-actuating device for tightening or loosening the wires extending along the length of the handle, entering into the bottom of the frame via the rotating knobs, and extending in the direction towards the connection mechanism. When the wire-actuating device tightens or loosens the wires, the connection mechanism is actuated to move between a first position wherein the connection mechanism is released from the mounting bracket, and a second position wherein the connection mechanism engages the mounting bracket.

4 Claims, 10 Drawing Sheets

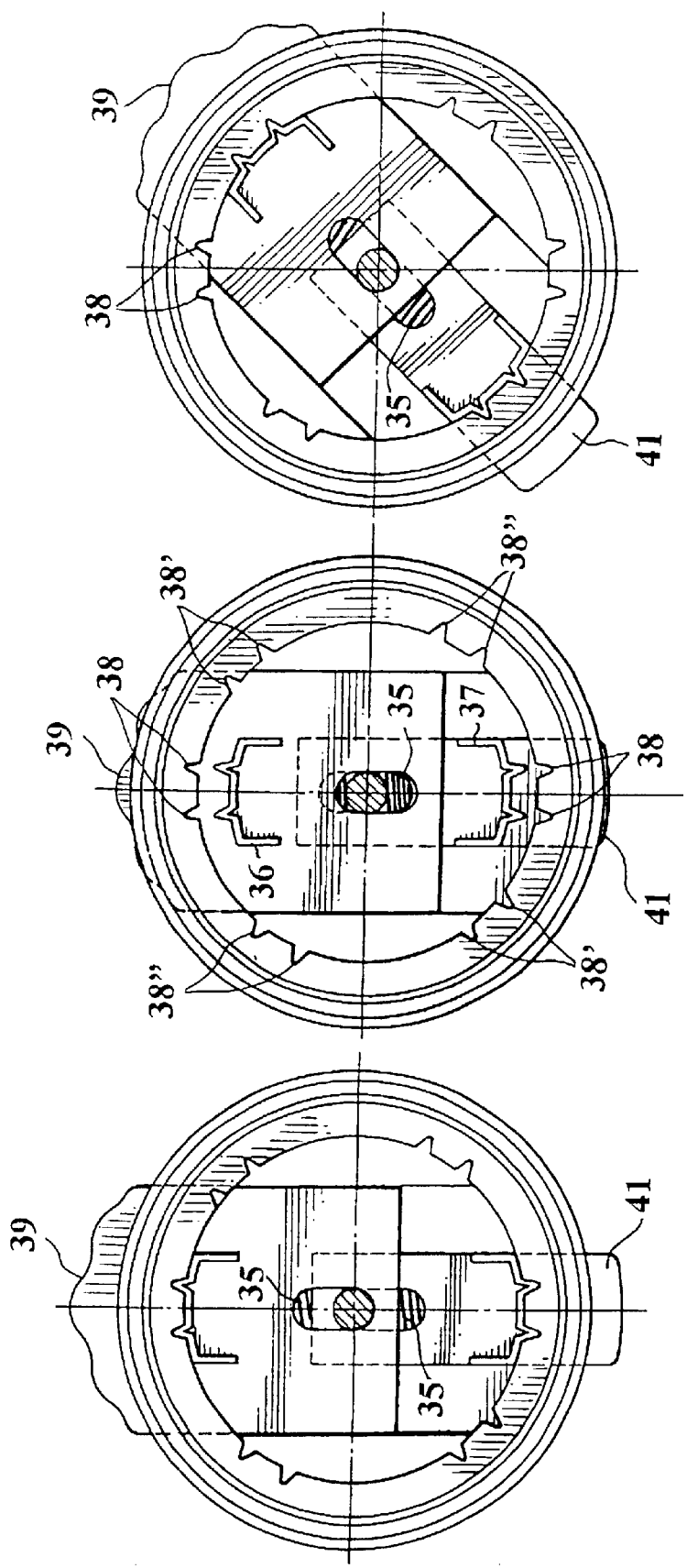

INFANT CARRIER

TECHNICAL FIELD

The present invention relates generally to an infant carrier, and in particular, to an infant carrier mountable to a mounting bracket of a car seat.

BACKGROUND OF THE INVENTION

Infant carriers are well-known in the art. They are simple in construction and easy to operate. An example of conventional infant carrier is shown in FIG. 1. To release the infant carrier 1 from the mounting bracket of the car seat (not shown), the user has to pull the finger pull 3 located at the lower rear of the frame 2. The finger pull 3 is operatively connected to front latch 4 and rear latch 5 by means of a link. When the finger pull 3 is pulled in the direction as shown by the arrow in FIG. 1, the front latch 4 and rear latch 5 is pivotally moved in the direction as shown by the arrows, so as to disengage from the front lever and rear lever of the mounting bracket respectively. In this way, the infant carrier can be released from the car seat.

However, when the user intends to pull the finger pull 3 located at the lower rear of the frame 2, the user has to move his/her hand to the back of the carrier. Such a movement is against the natural movement of a human, and is difficult to apply the force. It is, therefore, troublesome for a female to perform the operation.

Furthermore, if the finger pull 3 is accidentally pulled, for example, by a naughty child seated in the car, this infant carrier may disengage from the mounting bracket, resulting in an undesirable damage.

SUMMARY OF THE INVENTION

Accordingly, the present invention is directed to an infant carrier that substantially obviates one or more of the disadvantages of the related art carriers.

An object of the present invention is to provide an infant carrier that allows an operator to easily release the infant carrier from a mounting bracket of a car seat.

Another object of the present invention is to provide a design that is reliable and easy-to-operate.

Additional features and advantages of the present invention will be set forth in the description to follow. The objectives and other advantages of the invention will be realized and attained by the structure particularly pointed out in the written description and claims as well as the appended drawings.

BRIEF DESCRIPTION OF THE DRAWINGS

The present invention will now be described with reference to the accompanying drawings illustrating preferred embodiments, in which:

FIGS. 12A to 12C show the components of the handle assembly in combination, and schematically show the operation of the handle assembly.

DETAILED DESCRIPTION OF THE PREFERRED EMBODIMENTS

Reference will now be made in detail to the preferred embodiments of the present invention, examples of which are illustrated in the accompanying drawings.

Figure 1:
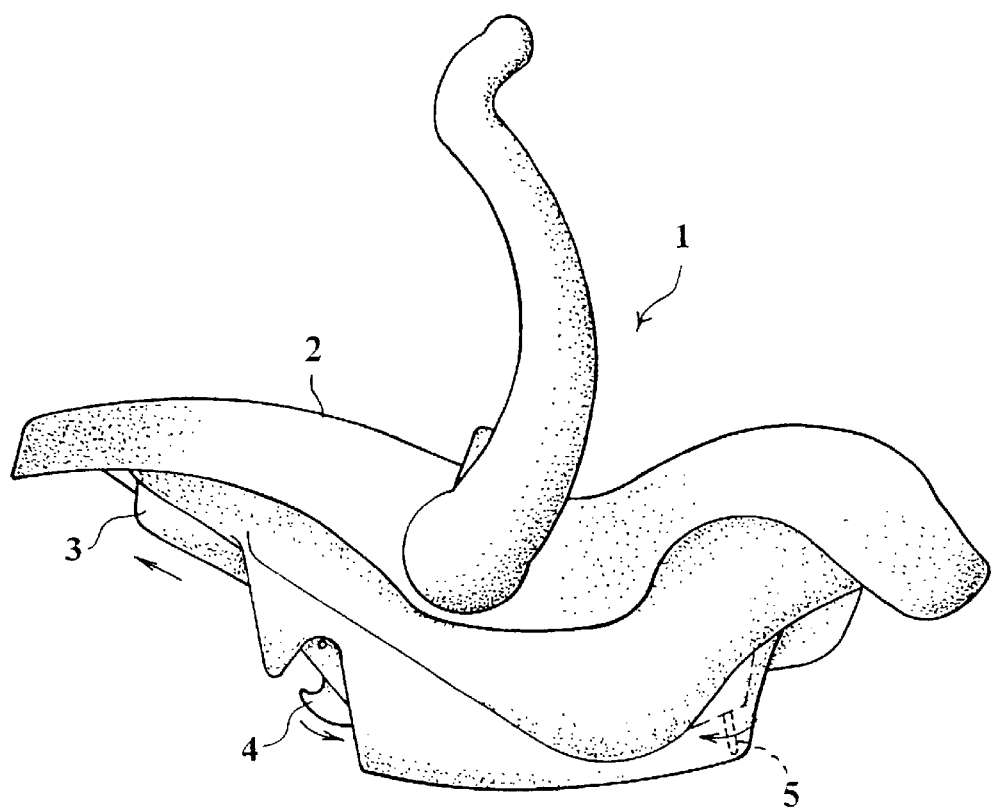
FIG. 1 is a schematic side view of a conventional infant carrier.
Figure 2:
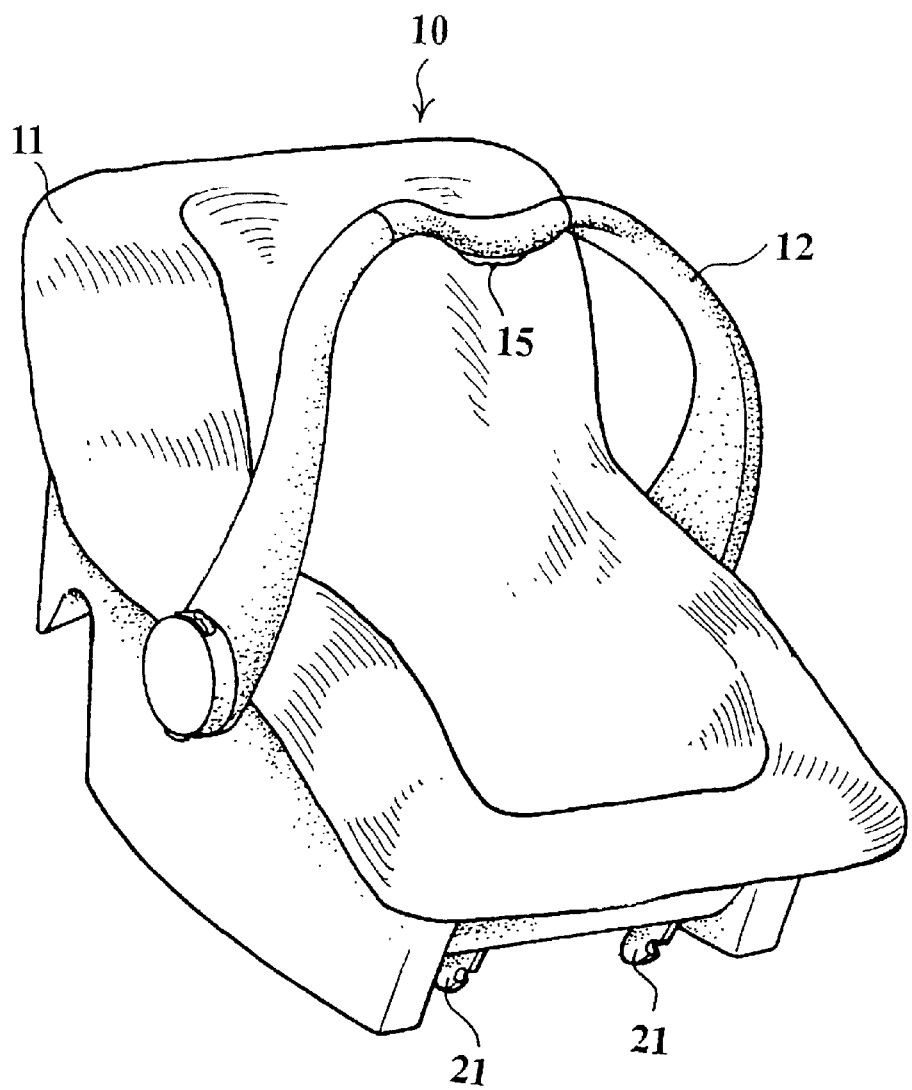
FIG. 2 is a perspective view of the infant carrier according to the present invention.
Figure 3:
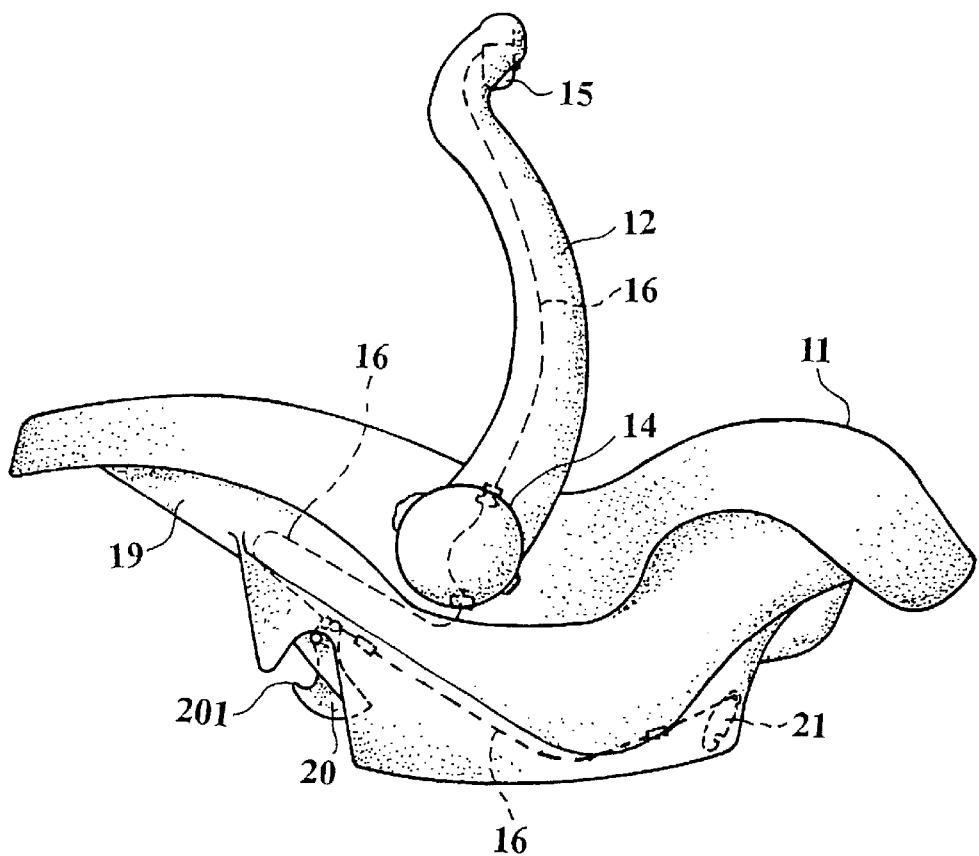
FIG. 3 is a side view of the infant carrier according to the present invention.

With reference to FIGS. 2 and 3, the infant carrier 10 according to the present invention comprises a frame 11, a handle 12, and a connection mechanism. The handle 12 is mounted to the frame 11 by connecting both ends to the rotating knobs 14 located at both sides of the frame 11. The handle 12 operates between several different positions.

Figure 4A:
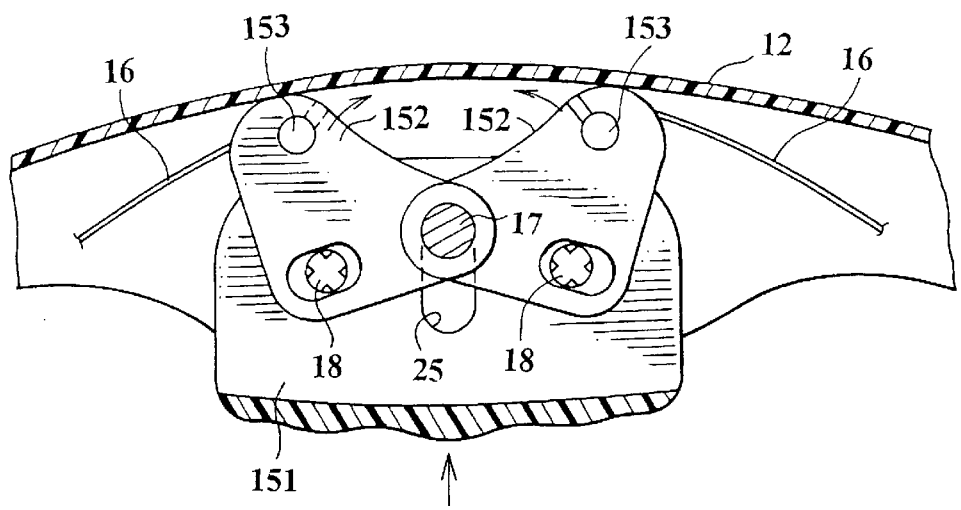
FIGS. 4a and 4b are sectional views of a gripping device.
Figure 4B:
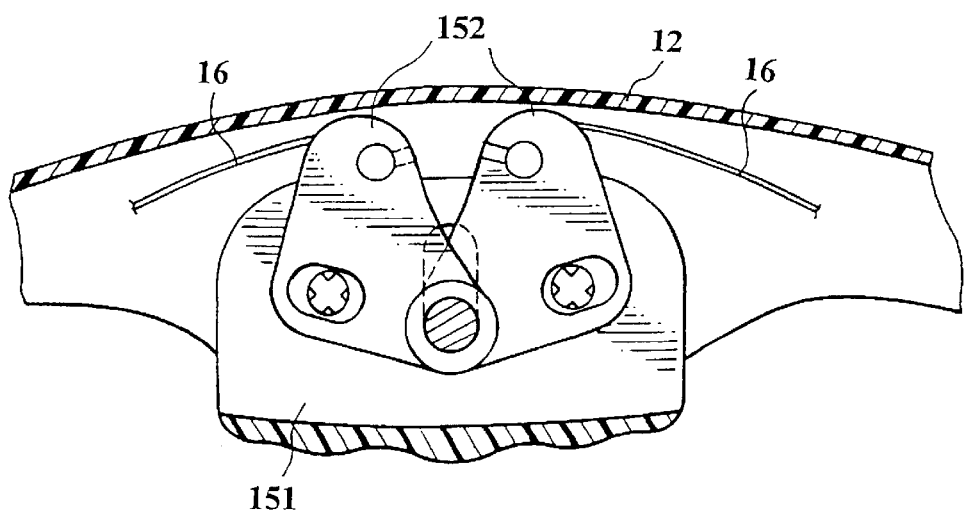

A gripping device 15 is provided at the intermediate position of the handle 12. FIGS. 4a and 4b show sectional views of the gripping device 15. With reference to FIG. 4a, the gripping device 15 includes a pressing portion 151 and a pair of actuating plates 152. The actuating plate 152 is substantially triangular in shape and is provided with a hole for each of the three corners. The two actuating plates 152 are received within the internal space of the gripping device 15. They are arranged in such a manner that they overlap with each other at one corner, and are integrally and pivotally connected to the handle 12 along with the pressing portion 151 by means of fastening means such as a pin 17. The pair of actuating plates 152 are further fixedly connected to the pressing portion 151 by means of pins 18 passing through the other corners thereof. The hole 153 of each of the actuating plates 152 provided proximal to the outer edge of the handle can receive a wire 16 therethrough. In such a manner, each of the actuating plates 152 is attached with a wire 16.

Figure 5:
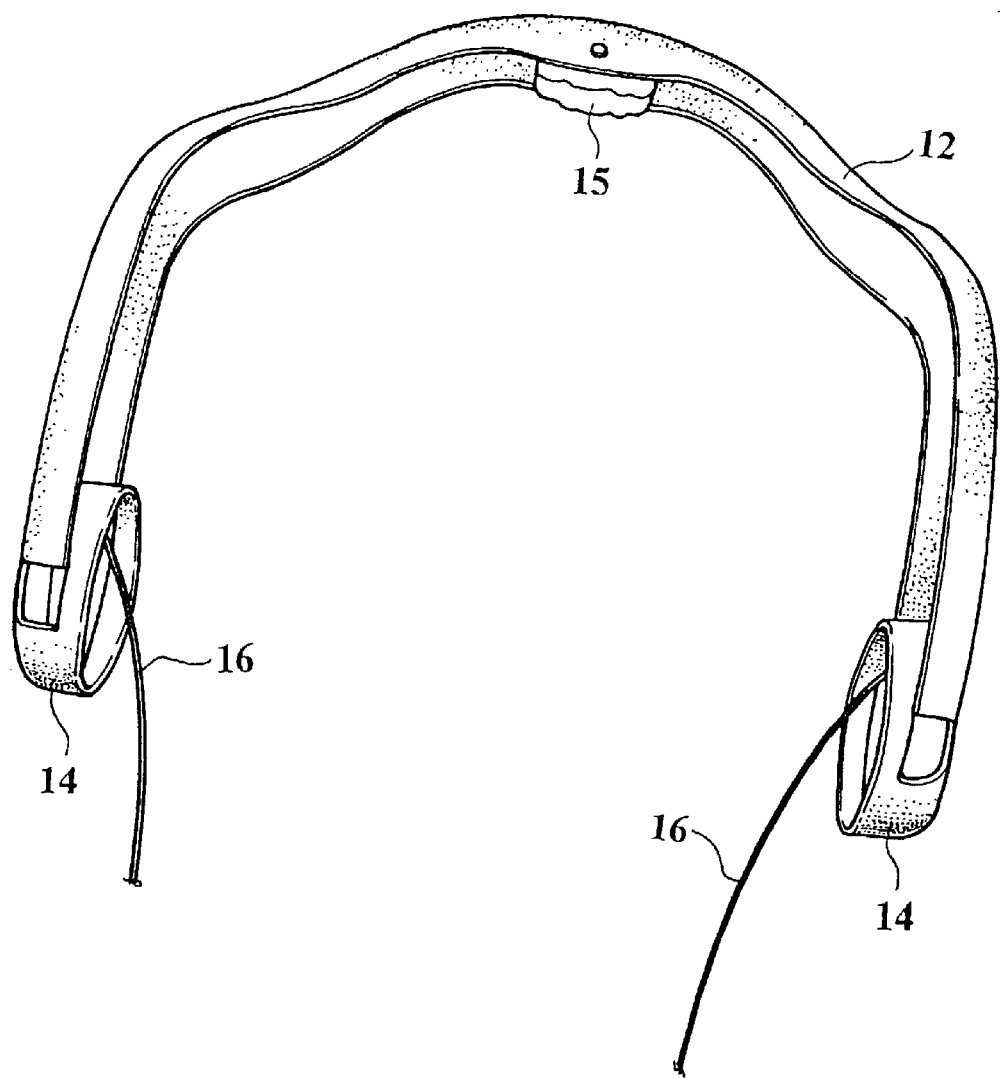
FIG. 5 is a perspective view of the handle, showing how the wires extend within the handle.

With reference to FIGS. 3 and 5, two wires 16 extend from the actuating plates 152 and stretch along in the cavity of the handle 12 to reach the rotating knobs 14, and then exit from the rotating knobs 14 to enter the interior space of the frame 11. The two wires 16 join with each other in the interior space of the frame 11 to form a single wire. The single wire is attached to the connection mechanism pivotally mounted on the frame 11 and extends partially beyond the base 19 of the frame.

Figure 6:
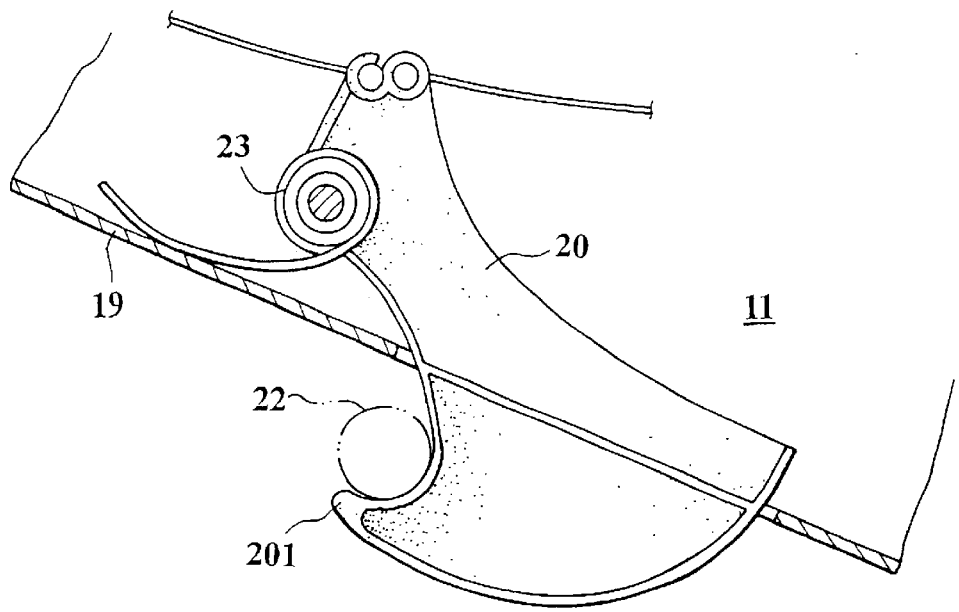
FIG. 6 is a side view of the front latch.
Figure 7:
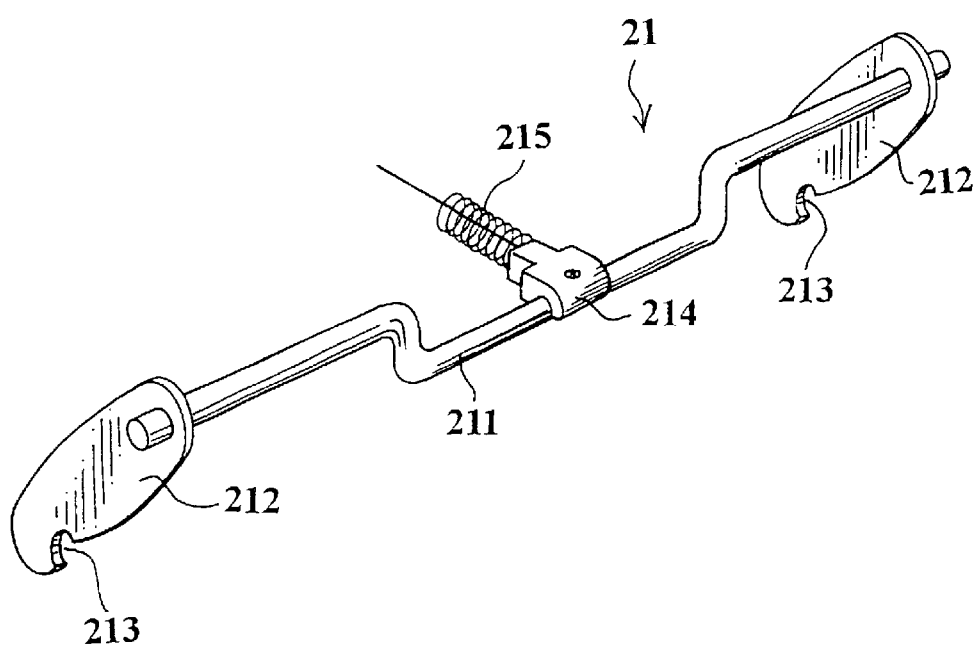
FIG. 7 is a perspective view of the rear latch assembly.

With reference to FIGS. 6 and 7, the connection mechanism comprises a front latch 20 and a rear latch assembly 21. The front latch 20 is composed of a sheet material substantially in the shape of an anchor. The portion of the front latch 20 that extends beyond the base 19 of the frame 11 is arcuated and terminates at a hook 201 at one end, so that the front latch 20 may latch on the front transverse lever 22 of the mounting bracket (not shown) of the car seat. Furthermore, the front latch 20 is disposed with a spring 23 to provide a restoring force such that the front latch 20 may restore to its original position after having been moved by an external force.

The rear latch assembly 21 comprises a connecting rod 211 and a pair of rear latches 212 provided at both ends of the connecting rod 211. The rear latch 212 is formed of a sheet material and substantially elliptical in shape. A concave portion 213 is provided at the lower part of each of the rear latches 212 to engage the rear transverse lever 24 of the mounting bracket (see FIG. 8). The connecting rod 211 passes through the connecting block 214, and is disposed in such a matter that it may pivotally move with respect to the connecting block 214. A spring 215 is disposed in front of the connecting block 214. When subjected to an external force, the rear latch 212 is pivotally moved. By means of the restoring force of the spring 215, the rear latch 212 may return to its original position.

Figure 8:
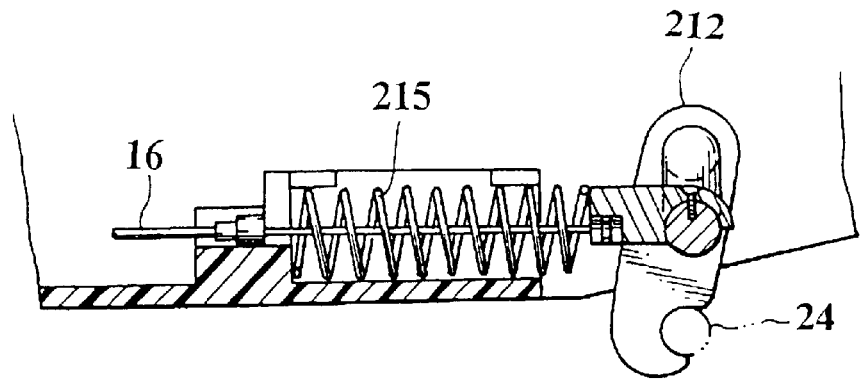
FIGS. 8 and 10 schematically show the operation of the rear latch assembly.

To place the infant carrier according to the present invention in the car seat, the user only needs to align the connection mechanism (including the front latch 20 and rear latch mechanism 21) with the transverse levers 22 and 24 of the mounting bracket (not shown); and then apply a slight force to latch the front latch 20 and rear latch mechanism 21 with the front transverse lever 22 and rear transverse lever 24 respectively. In detail, when a slight downward force is applied onto the infant carrier 10, the arcuated portion of the front latch 20 urges against the front transverse lever 22 due to the elastic force provided by the spring 23, and the hook 201 securely hook on the front transverse lever 22 (FIG. 6). In the meantime, the concave portion 213 of the rear latch 212 comes to engage with and receives therein the rear transverse 24 (FIG. 8). In this way, the infant carrier 10 is securely mounted onto mounting bracket of the car seat.

In the operation to release the infant carrier 10 from the mounting bracket of the car seat, the handle 12 of the infant carrier 10 is pulled to a substantially vertical position, and a force is exerted on the pressing portion 151 of the gripping device 15 (in the direction as indicated by the arrow in FIG. 4a). Upon the exertion of the force on the pressing portion 151, the two actuating plates 152 are actuated in such a manner that the corners thereof proximal to the handle will move towards each other in the directions as indicated by the arrows, and the corners pivotally connected to each other by means of the pin 17 will move downward along the slot 25 provided in the pressing portion 151. In this way, the two wires 16 are pulled inward by the two actuating plates 152 respectively. FIG. 4b shows the state where the two actuating plates 152 have been actuated as mentioned above.

Figure 9:
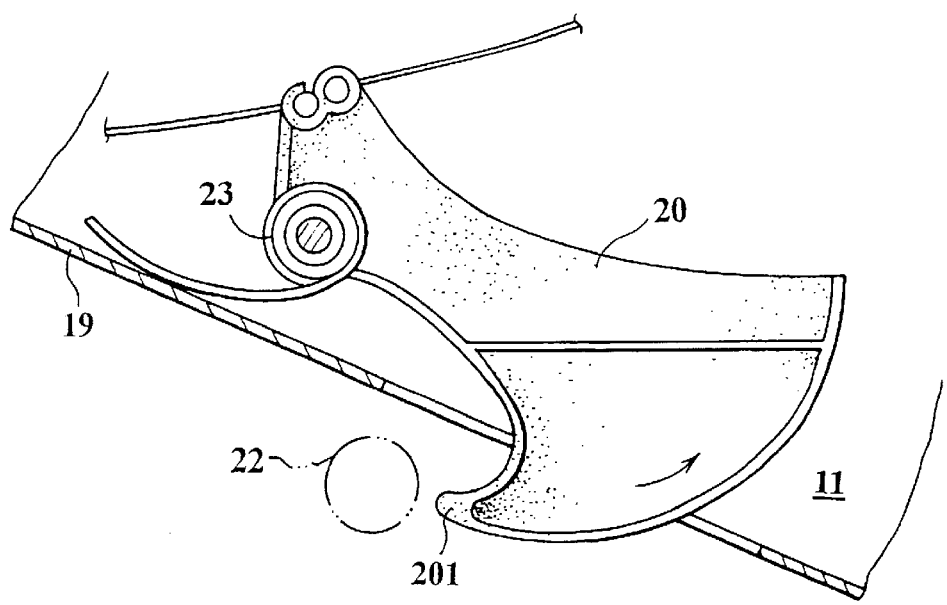
FIG. 9 schematically shows the operation of the front latch.
Figure 10:
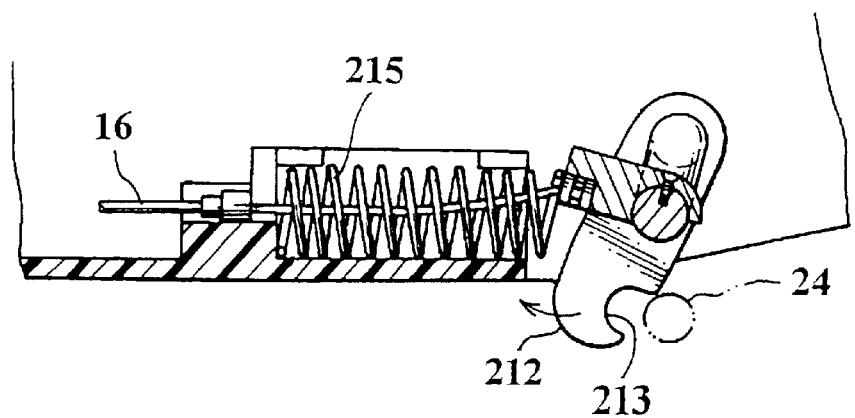

As the wires 16 are pulled as shown in FIG. 4b, the front latch 20 is pivotally moved in the direction as shown by an arrow (FIG. 9), to thereby disengage from the front transverse lever 22. Simultaneously, the wire 16 for the rear latch mechanism 21 is also pulled to actuate the rear latch 212 to pivotally move in the direction as indicated by the arrow in FIG. 10, to thereby disengage the rear latch 212 from the rear transverse lever 24. Consequently, the infant carrier 10 can be easily released from the mounting bracket of the car seat.

When the handle 12 of the infant carrier 10 is placed in a horizontal position, the wire 16, which is in slack condition, will not actuate the front latch 20 and rear latches 212 to disengage from the front and rear transverse levers 22 and 24 of the mounting bracket respectively. Therefore, even the pressing portion 151 is accidentally pressed, the infant carrier 10 will not be released.

Figure 11:
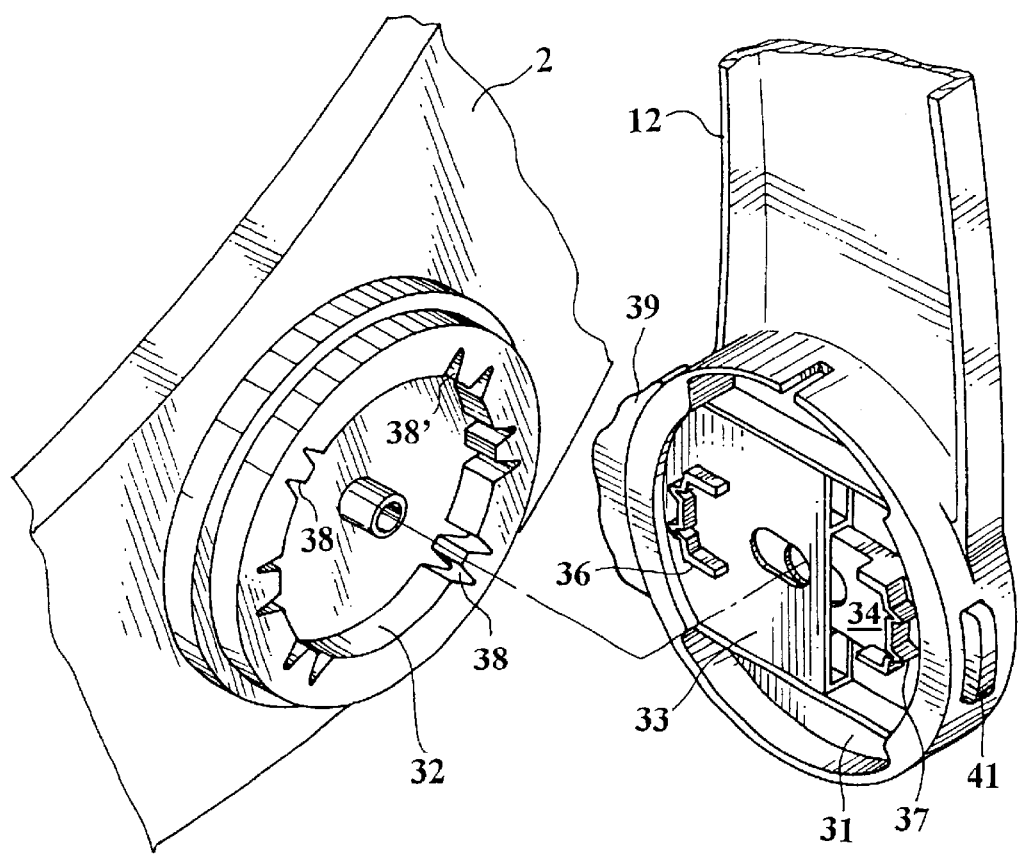
FIG. 11 is an exploded view of the handle assembly.

A further feature of the present invention lies in the handle assembly. As shown in FIG. 11, the handle assembly comprises two opposed chambers 31 and 32 substantially circular in shape. Chamber 31 is formed at the end of the handle 12 and chamber 32 is formed on the frame 2 of the infant carrier 10. The circular chamber 31 of the handle 12 is designed to accommodate an actuating device composed of two plates 33 and 34 connected to each other by a spring 35 (FIG. 12A). Both the two plates 33, 34 are provided with a plurality of finger-like protrusions 36, 37 at one end.

The chamber 31 formed at the end of the handle 12 is arranged to oppose the chamber 32 formed on the frame 2 of the infant carrier 10, so that the two chambers 31 and 32 may fit on each other to form an integral body. The chamber 32 has a plurality of recesses 38, 38' provided on the periphery, which are adapted to receive the protrusions 36, 37 of the plates 33, 34.

With reference to FIGS. 12A to 12C, the chamber 31 of the handle 12 and the chamber 32 of the frame 2 fit on each other to form an integral body. The finger-like protrusions 36, 37 are biased into the first pair of recesses 38 due to the elastic force of the spring 35, as shown in FIG. 12A. The handle 12 at this instant is located at the first position, for example, a vertical (up-standing) position.

To move the handle 12, the user manually presses on the two opposed lugs 39 and 41 simultaneously. The plates 33, 34 acted on by the lugs 39, 41 respectively will then move toward each other, and the protrusions 36, 37 of the plates 33, 34 will retract to disengage from the first pair of recesses 38, as shown in FIG. 12B. At this moment, the handle 12 can be moved to another position. When the plates 33, 34 reach a position where the protrusions 36, 37 thereof are in alignment with the second pair of recesses 38', the protrusions 36, 37 will move into the opposed recesses 38' due to elastic force of the spring, as shown in FIG. 12C. The handle 12 is then secured in that position, for example, a tilted position. In the same manner, the protrusions 36, 37 of the plates 33, 34 can be inserted into third pair of recesses 38" to securely position the handle at another position, for example, a horizontal position.

Although the foregoing has been described in terms of presently preferred and alternate embodiments, those skilled in the art will recognize that the invention is not limited to the embodiments described. The apparatus of the present invention can be practiced with modification and alteration within the spirit and scope of the appended claims. The description is thus to be regarded as illustrative instead of limiting the present invention.

I claim:

1. An infant carrier comprising:
    a frame having a rotating knob at each side thereof,
    a handle having both ends connected to the respective rotating knobs of the frame,
    connection means mounted at the bottom of a frame, and adapted to be removably attached to a mounting bracket of a car seat,
    wherein a gripping device is provided at an intermediate position of the handle, said gripping device includes wires and wire-actuating means, the wires and the wire-actuating means are connected such that the wire-actuating means is adapted for tightening or loosening the wires, the wires extend along the length of the handle, enter into the bottom of the frame via the rotating knobs, and extend in the direction towards the connection means,
    connection means is fastened to the wires extending from the gripping device, when the wire-actuating means tightens or loosens the wires, the connection means is actuated to move between a first position wherein the connection means is released from the mounting bracket, and a second position wherein the connection means engages the mounting bracket so that the frame is securely positioned on the mounting bracket.

2. The infant carrier according to claim 1, wherein the wire-actuating means comprises a pressing portion and a pair of actuating plates substantially triangular in shape, each of the actuating plates having a hole at a first corner proximal to an outer edge of the handle, the hole is adapted to be passed through by the wire so that the wire can be attached to the actuating plate, the pair of actuating plates overlap each other at a second corner, and are integrally and pivotally connected to the handle along with the pressing portion.

3. The infant carrier according to claim 1 or 2, wherein the connection means comprises a front latch and a rear latch assembly, the front latch is composed of a sheet material, a portion of the front latch extending beyond the bottom of the frame is arcuate and terminates at a hook at one end, so that the front latch is adapted for latching on a first transverse lever of the mounting bracket, the rear latch assembly comprises a connecting rod and a pair of rear latches provided at both ends of the connecting rod, each of the rear latches is formed of a sheet material and has a concave portion at a lower part thereof to engage a second transverse lever of the mounting bracket, both the front latch and the rear latch assembly are provided with springs such that the front latch and the rear latch assembly is adapted for returning to original positions by action of the restoring force of the springs when the front latch and the rear latch assembly are moved by external forces.

4. The infant carrier according to claim 3, wherein when the handle of the infant carrier is placed at a horizontal position, the wire is under a slack condition and cannot actuate the front latch and rear latch assembly to disengage from the first and second transverse levers of the mounting bracket respectively.

* * * * *